UNITED STATES PATENT OFFICE.

LOUIS E. BARTON, OF NIAGARA FALLS, NEW YORK, ASSIGNOR TO THE TITANIUM ALLOY MANUFACTURING COMPANY, OF NEW YORK, N. Y., A CORPORATION OF MAINE.

PROCESS FOR OBTAINING OXID OF TITANIUM FROM MATERIALS INCORPORATING OTHER SUBSTANCES.

1,235,638.  Specification of Letters Patent.  Patented Aug. 7, 1917.

No Drawing.  Application filed March 30, 1917. Serial No. 158,527.

*To all whom it may concern:*

Be it known that I, LOUIS E. BARTON, a citizen of the United States, and a resident of Niagara Falls, in the county of Niagara and State of New York, have invented a new and useful Process for Obtaining Oxid of Titanium from Materials Incorporating other Substances, of which the following is a specification.

This invention relates to the separation, or concentration, of the oxid of titanium from materials containing the same entangled with undesired substances, including compounds of other metals, and its objects comprise so doing with greater ease, economy and perfection than heretofore, the resulting final products consisting, except negligibly, of the titanic oxid desired.

The distinctive essentials of the process are as follows: The material containing the titanic substance is dissolved in any appropriate, or available, acid, such, for example, as sulfuric, hydro-fluoric, or hydrochloric. Through the resulting solution, preferably diluted to contain a relatively low percentage of said oxid, is then passed a current of electricity, the solution being meanwhile heated below boiling. This results in precipitation of a hydrated compound of titanium, the which precipitate is thus obtained without addition to the solution of alkalis, etc., and, being filtered out and calcined to complete dehydration, yields normally a final product consisting solely of the titanic oxid, or, exceptionally, only negligibly contaminated.

The process is well adapted to the obtaining of essentially pure titanic oxid from materials such as ores, or concentrates, containing therewith entangled undesired substances such as gangue, or compounds of metals other than titanium, *e. g.* iron compounds. As thus employed, the process is, for example, practised as follows: Any titaniferous material, such as titaniferous iron ore, ilmenite, rutile, or preferably, on account of its greater purity, the titanic acid product of the method described and claimed in Letters Patent No. 1,171,542, granted to Auguste J. Rossi and myself February 15, 1916, is dissolved in acid, in this instance, preferably, sulfuric acid.

This solution is then, as a catholyte, charged in the cathode compartment of a diphragmed electrolytic cell, into the anode compartment of which is charged any suitable acid solution, in this instance preferably a sulfuric acid solution. Electrodes, preferably of lead, or of any other substance, or substances, capable of, under the conditions, resisting the action of the electrolytes during the electrolysis, are employed. The current being then turned on, and continued, sulfuric acid will accumulate in the anode, and correspondingly diminish in the cathode, compartment and the catholyte being meanwhile, or thereafter, heated up to preferably 90° C. to 95° C., there will be therein precipitated, and on several accounts advantageously, a hydrated compound of titanium, *i. e.* a metatitanic acid compound, for example, basic titanic sulfate, instead of an orthotitanic acid or the like product. The current conditions may be varied considerably, but from 5 to 10 volts, and of a current density of about 30 amperes per square foot, will give satisfactory results.

As to temperatures employed in the heating, passable results are sometimes obtainable from a little lower temperatures than those above indicated, and also from higher, even up to boiling, though these are rarely, if ever, desirable in practice. In some cases the required heating may be more conveniently applied to the solution withdrawn from the cell after the electrolysis.

It seems that the effect of the electrolysis is to concentrate the titanic oxid and the sulfuric acid in their respective compartments and to maintain the iron, if any present, in ferrous state, and consequently in solution.

In actual operations there have been thus obtained yields in precipitates of from 85% to 95% of the total titanic oxid in the solution, in from two and a half to five hours, but the time required will, of course, in each specific instance, depend upon temperature and current conditions. The acid accumulated in the anode compartment, as aforesaid, is in consequence readily recoverable.

The resulting hydrated precipitates are, as usual, filtered out and dried, and are of exceptional value for many uses in the arts, being devoid of iron and other impurities except negligibly.

To reduce these precipitate products to oxid form, it is necessary only to calcine them to substantially complete dehydration at say about 750° C.

I am aware that Letters Patent No. 758,710, granted to Howard Spence May 3rd, 1904, purport to disclose the reduction of titanic sulfate solutions to titanous sulfate solutions by aid of using the former as a catholyte and thereby electrolyzing it in a diaphragm cell, and this step I do not wish to be understood as constituting, by itself, any part of my invention, or as covered by my herein claim.

Having now described my invention, what I claim as new and desire to secure by Letters Patent is the following, viz:

The method of obtaining the oxid of titanium from material containing it entangled with undesired substances which comprises dissolving the said material in a suitable acid, electrolyzing the resulting solution in the cathode compartment of a diaphragmed electrolytic cell the anode compartment of which contains an acid solution, heating the resulting catholyte solution, withdrawing the resulting precipitated hydrated compound of titanium and calcining it.

LOUIS E. BARTON.

Witnesses:
Tom C. Graham,
Ralph S. Tabor.